(12) United States Patent
Li et al.

(10) Patent No.: US 7,822,108 B2
(45) Date of Patent: Oct. 26, 2010

(54) CODE DIVISION MULTIPLE ACCESS RECEIVER AND METHOD FOR PROCESSING SIGNALS THEREOF

(75) Inventors: Sung-Chiao Li, Taipei (TW); Ching-Chia Hsu, Taipei (TW); Chi-Yuan Peng, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 770 days.

(21) Appl. No.: 11/622,600

(22) Filed: Jan. 12, 2007

(65) Prior Publication Data

US 2007/0165706 A1 Jul. 19, 2007

Related U.S. Application Data

(60) Provisional application No. 60/758,964, filed on Jan. 13, 2006.

(30) Foreign Application Priority Data

Sep. 4, 2006 (TW) .............................. 95132571 A

(51) Int. Cl.
*H04B 1/00* (2006.01)
*H04J 11/00* (2006.01)
*H04B 7/216* (2006.01)
*H04M 15/00* (2006.01)

(52) U.S. Cl. .................. 375/150; 375/140; 375/143; 370/209; 370/320; 370/342; 455/506

(58) Field of Classification Search ................ 370/209, 370/320, 342; 375/140, 143, 150; 455/506
See application file for complete search history.

(56) References Cited

U.S. PATENT DOCUMENTS

| | | | | |
|---|---|---|---|---|
| 5,377,226 A | * | 12/1994 | Davis | 370/342 |
| 5,710,768 A | * | 1/1998 | Ziv et al. | 370/342 |
| 5,960,028 A | * | 9/1999 | Okamoto et al. | 375/130 |
| 6,108,317 A | * | 8/2000 | Jones et al. | 370/320 |
| 6,154,486 A | * | 11/2000 | Scott et al. | 375/142 |
| 6,356,607 B1 | * | 3/2002 | Scott et al. | 375/354 |
| 6,370,182 B2 | * | 4/2002 | Bierly et al. | 375/140 |
| 6,385,259 B1 | * | 5/2002 | Sung et al. | 375/343 |
| 6,731,673 B1 | * | 5/2004 | Kotov et al. | 375/145 |
| 6,748,006 B1 | * | 6/2004 | McDonough et al. | 375/140 |
| 7,023,902 B2 | * | 4/2006 | Sih et al. | 375/147 |
| 7,062,284 B2 | * | 6/2006 | Vihriala | 455/506 |

(Continued)

*Primary Examiner*—David C Payne
*Assistant Examiner*—Erin M File
(74) *Attorney, Agent, or Firm*—Thomas, Kayden, Horstemeyer & Risley

(57) ABSTRACT

The invention provides a Code Division Multiple Access (CDMA) receiver for sampling a received CDMA signal into a plurality of samples. The CDMA receiver comprises a sampling control module, a code generator, and a plurality of despreaders. The sampling control module delays the samples for a plurality of different delay lengths to obtain a plurality of delayed samples respectively corresponding to each of the delay lengths, and adjusts timing of a sampling trigger signal and a code generation trigger signal according to a sampling timing adjustment signal. The code generator generates a despreading code according to the code generation trigger signal. Each of the despreaders is configured for decimating the delayed samples corresponding to each delay lengths according to the sampling trigger signal to obtain a plurality of decimated delayed samples, and despreads the decimated delayed samples with the despreading code to obtain a plurality of output signals.

20 Claims, 24 Drawing Sheets

U.S. PATENT DOCUMENTS 7,149,240 B2 * 12/2006 McDonough et al. ....... 375/146
7,277,471 B2 * 10/2007 Rick et al. ................. 375/148
2001/0028675 A1 * 10/2001 Bierly et al. ................ 375/143
2001/0046205 A1 * 11/2001 Easton et al. ............... 370/209
2003/0186714 A1 * 10/2003 Vihriala ..................... 455/506

* cited by examiner

CODE DIVISION MULTIPLE ACCESS RECEIVER AND METHOD FOR PROCESSING SIGNALS THEREOF

BACKGROUND OF THE INVENTION

1. Field of the Invention

The invention relates to Code Division Multiple Access (CDMA) receivers, and more particularly to demodulation of CDMA signals.

2. Description of the Related Art

Because there are a variety of transmission paths in CDMA systems, differences of transmission paths induce different levels of delay and attenuation of CDMA signal. It is well known as multi-path effect. For example, closely transmission paths for an urban area and loosely rural transmission paths cause different levels of signal distortion. In addition, the relative motion between a transmitting side and a receiving side also causes transmission path alteration; the delay of signal is varied along the time.

To relieve signal distortion from multi-path effect, each receiving finger of a rake receiver tracks and despreads received CDMA signal. Each time tracking loop tracks delays of the CDMA signals received by each rake finger corresponding to each different transmission path. The CDMA signals are then sampled. When the transmission paths of received CDMA signals change, the time tracking loop must advance or retard sampling timings to obtain optimal samples of the CDMA signals.

FIG. 1 is a block diagram of a portion of a CDMA receiver 100. The CDMA receiver 100 includes a sampling module 102, a code generator 104, a despreader 106, and a sample selection loop 108. Since the received samples of the receiver 100 are over sampling, the sampling module 102 may need to do down-sampling to decrease the sampling rate to adapt for a chip rate before any further processing by the CDMA receiver 100. The code generator 104 generates a despreading code according to a code generation trigger signal generated by the sampling module 102. The despreader 106 demodulates the samples to obtain original data transmitted by a CDMA transmitter.

The sampling module 102 first samples a CDMA signal received by the CDMA receiver 100 to obtain a plurality of samples including a series of early samples, a series of on-time samples, and a series of late samples. The sample selection loop 108 selects a series of optimal samples from the early samples, the on-time samples, and the late samples with the time tracking loop. The early samples, the on-time samples, and the late samples are respectively despread by corresponding despreaders 112, 114, and 116 with corresponding despreading codes generated by the code generator 104 to obtain an early output signal, an on-time output signal, and a late output signal. Finally, an optimal sample decision module 110 selects the optimal samples among the early samples, the on-time samples, and the late samples, and notifies the sampling module 102 of the selection with a sampling timing adjustment signal according to the selection.

FIG. 2 is a block diagram of a portion of CDMA receiver 200 which includes a timing control module 202 for implementing the sampling module 102 of FIG. 1. The timing control module 202 generates sampling trigger signals for early samples, on-time signals, and late signals. A series of samples with high sampling rate is delivered to despreaders 204, 206, and 208. The despreaders 204, 206, and 208 respectively decimate the samples according to the sampling trigger signals to obtain the early samples, on-time samples, and late samples. The despreaders 204, 206, and 208 then respectively demodulate the early samples, on-time samples, and late samples with the corresponding despreading codes to obtain an early output signal, an on-time signal, and a late output signal. The code generator 210 generates the despreading codes for the despreaders 204, 206, and 208 according to the code generation trigger signals. The decimation and demodulation are further illustrated in FIGS. 3 and 4.

FIG. 3a to 3c show decimation and demodulation in despreaders with a decimation factor of 4. FIG. 3a shows normal decimation and demodulation in despreaders 204, 206, and 208. A series of samples with indices of −4~15 are shown. Because the decimation factor is 4, the despreaders 204, 206, and 208 select one sample from every four samples according to the trigger of corresponding sampling trigger signals to obtain the early samples, the on-time samples, and the late samples. The enabling periods of the sampling trigger signals, corresponding to the early samples, the on-time samples, and the late samples, are respectively marked with letters "C", "B", and "A" in FIG. 3a.

An advance-retard (AR) counter periodically resets to meet the requirement of the decimating factor of 4. If a sample with the AR counter index of 0 is selected as an on-time sample, samples with the AR counter indices of −2 (equivalent to index 2 of pervious period) and 2 are respectively selected as an early sample and a late sample. For example, the AR counter indices of the samples with samples indices of 6, 8, and 10 are respectively −2, 0, and 2. Thus, the timing control module 202 must respectively enable the sampling trigger signals, corresponding to the early samples, the on-time samples, and the late samples, whenever the AR counter index is 2, 0, and −2.

The timing control module 202 must generate the code generation trigger signals in time to trigger the code generator 210 to change the despreading codes. For example, the samples with indices 6, 8, and 10 are respectively sampled as an early sample, an on-time sample, and a late sample, and demodulated with a common despreading code 2 to obtain the corresponding early output signal, on-time output signal, and late output signal, respectively. Thus, the code generator 210 must respectively deliver the common despreading code 2 to the despreaders 204, 206, and 208 at the periods corresponding to the samples 6, 8, and 10 according to the code generation trigger signal.

FIG. 3b shows adjustment of decimation and demodulation in despreaders 204, 206, and 208 in response to a sampling timing adjustment signal indicating advancement. The sampling timing adjustment signal advances the timing of the on-time sampling and the late sampling. Thus, the despreaders 206 and 208 take the samples 7 and 9 as an on-time sample and a late sample. Accordingly, the code generation trigger signal is also advanced for a sampling period to trigger the code generator 210 for generating the despreading codes. Thus, the samples 6, 8, and 9 sampled as an early sample, an on-time sample, and a late sample in FIG. 3a are advanced as the samples 6, 7, and 9 in FIG. 3b. The early sample of sample 6, however, is not changed to the sample 5 because the sampling timing adjustment signal is enabled subsequent to appearance of sample 6. A sampling error therefore occurs to affect the generation of the early output signal, inducing wrong selection of an optimal sample in the optimal sample decision module 110.

FIG. 3c shows adjustment of decimation and demodulation in despreaders 204, 206, and 208 in response to a sampling timing adjustment signal indicating retardation. The sampling timing adjustment signal delays the timing of the on-time sampling and the late sampling. Thus, the despreaders 206 and 208 take the samples 9 and 11 as an on-time sample and a late sample. Accordingly, the code generation trigger signal is also delayed for a sampling period to trigger the code generator 210 for generating the despreading codes. Thus, the samples 6, 8, and 9 sampled as an early sample, an on-time sample, and a late sample in FIG. 3a are retarded as the samples 6, 9, and 11 in FIG. 3c. The early sample of sample 6, however, is not changed to sample 7 because the sampling timing adjustment signal is enabled subsequent to appearance of sample 6. A sampling error therefore occurs to affect the generation of the early output signal, inducing wrong selection of an optimal sample in the optimal sample decision module 110.

FIG. 4a to 4c show decimation and demodulation in despreaders with a decimation factor of 8. FIG. 4a shows normal decimation and demodulation in despreaders 204, 206, and 208. A series of samples with indices of –8~32 are shown. Because the decimating factor is 8, the despreaders 204, 206, and 208 select one sample from every eight samples according to the trigger of corresponding sampling trigger signals to obtain the early samples, the on-time samples, and the late samples. The enabling periods of the sampling trigger signals corresponding to the early samples, the on-time samples, and the late samples are respectively marked with letters "C", "B", and "A" in FIG. 4a. If a sample with the AR counter index of 0 is selected as an on-time sample, samples with the AR counter indices of –5 (equivalent to index 3 of previous period) and 5 are respectively selected as an early sample and a late sample. For example, the samples 11, 16, and 21 are respectively sampled as an early sample, an on-time sample, and a late sample.

FIGS. 4b and 4c respectively show adjustments of decimation and demodulation in despreaders 204, 206, and 208 in response to sampling timing adjustment signals indicating advancement and retardation. The timing control module 202 receives the sampling timing adjustment signal advancing or retarding the sampling of the on-time samples and the late samples. Thus, the samples 11, 16, and 21 sampled as an early sample, an on-time sample, and a late sample in FIG. 4a are advanced as the samples 11, 15, and 20 in FIG. 4b and are retarded as the samples 11, 17, and 22 in FIG. 4c. The early sample of index 11, however, is not advanced or retarded as the sample 10 or the sample 12 because the sampling timing adjustment signal is enabled subsequent to appearance of sample 11. A sampling error therefore occurs to affect the generation of the early output signal, inducing wrong selection of an optimal sample in the optimal sample decision module 110.

Sampling errors of timing control module 202 of FIG. 2 are therefore induced and cause wrong selection of an optimal sample in the optimal sample decision module 110. Additionally, the despreaders 204, 206, and 208 for early samples, on-time samples, and late samples don not synchronously execute sampling action, and the obtained early output signal, on-time output signal, and late output signal are asynchronous, increasing the signal processing burdens and complicating system design. Thus, a solution the aforementioned problem is desirable for processing a CDMA signal.

BRIEF SUMMARY OF THE INVENTION

The invention provides a Code Division Multiple Access (CDMA) receiver for sampling a received CDMA signal into a plurality of samples. The CDMA receiver comprises a sampling control module, a code generator, and a plurality of despreaders. The sampling control module delays the samples for a plurality of different delay lengths to obtain a plurality of delayed samples respectively corresponding to each of the delay lengths, and adjusts timings of a sampling trigger signal and a code generation trigger signal according to a sampling timing adjustment signal. The code generator generates a despreading code according to the code generation trigger signal. The despreaders are configured for decimating the delayed samples corresponding to each delay lengths according to the sampling trigger signal to obtain a plurality of decimated delayed samples, and despreads the decimated delayed samples with the despreading code to obtain a plurality of output signals.

The invention provides a method for processing a Code Division Multiple Access (CDMA) signal. First, the CDMA signal is sampled to obtain a plurality of samples. The samples are then delayed for a plurality of different delay lengths into a plurality of delayed samples respectively corresponding to each of the delay lengths. Timings of a sampling trigger signal and a code generation trigger signal are then adjusted according to a sampling timing adjustment signal. A despreading code is then generated according to the trigger of the code generation trigger signal. Finally, the delayed samples corresponding to each delay lengths are decimated according to the sampling trigger signal to obtain a plurality of decimated delayed samples.

The invention also provides a sampling control module processing a plurality of early samples derived from a CDMA signal received by a CDMA receiver. The sampling control signal includes a first delay line, a second delay line, and an advance-retard counter. The first delay line delays the early samples to obtain a plurality of on-time samples. The second delay line delays the on-time samples to obtain a plurality of late samples. The advance-retard counter adjusts timings of a sampling trigger signal and a code generation trigger signal according to a sampling timing adjustment signal. The CDMA receiver generates a despreading code according to the trigger of the code generation trigger signal, respectively decimates the early samples, the on-time samples, and the delayed samples according to trigger of the sampling trigger signal to obtain a plurality of decimated early samples, a plurality of decimated on-time samples, and a plurality of decimated late samples, and respectively despreads the decimated early samples, the decimated on-time samples, and the decimated late samples with the despreading code to obtain a plurality of output signals A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Although the invention is illustrated with am embodiment of a CDMA receiver, the invention can be equally applied in other types of communication devices.

Figure 1:
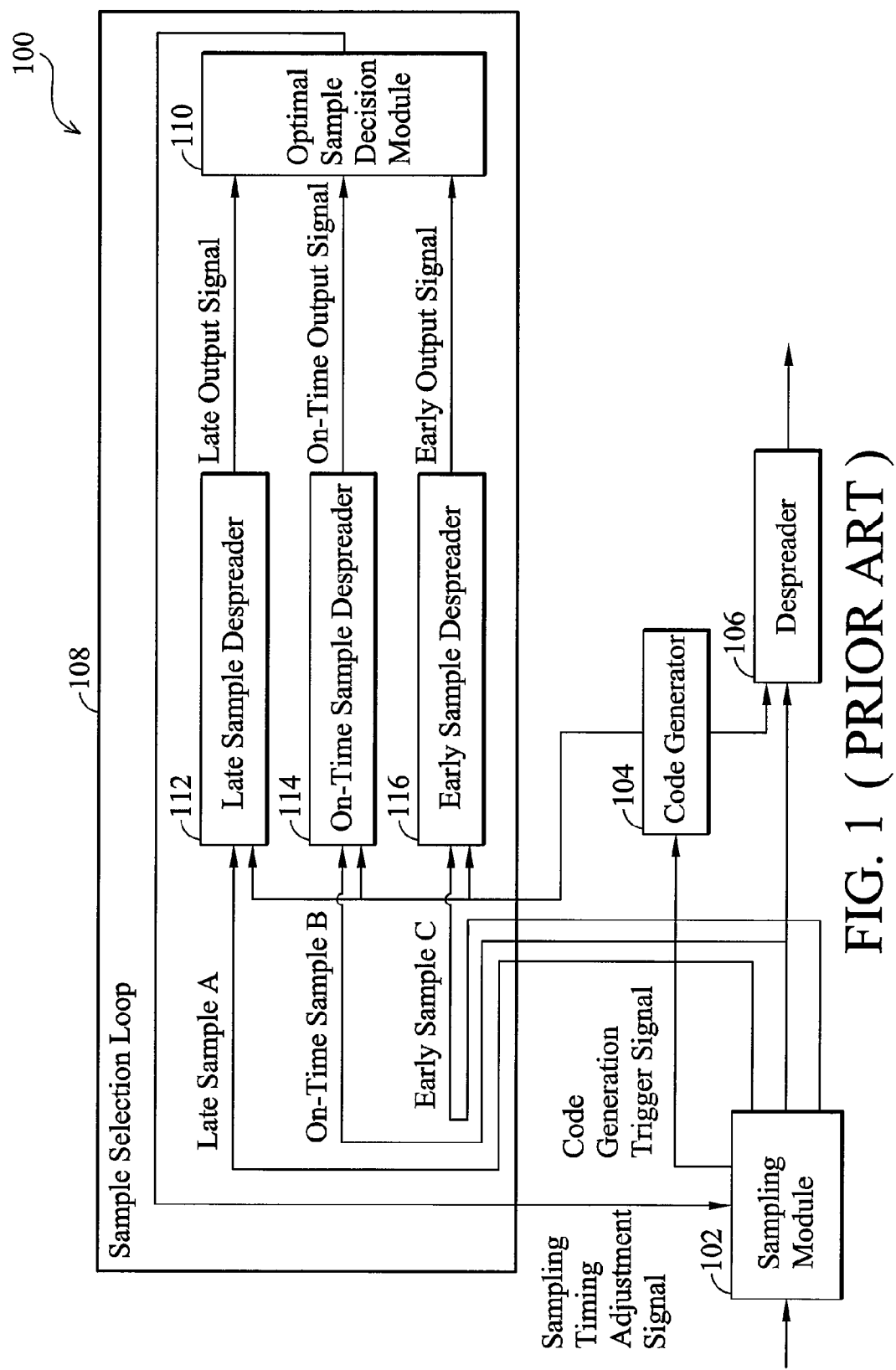
FIG. 1 is a block diagram of a portion of a CDMA receiver.
Figure 5:
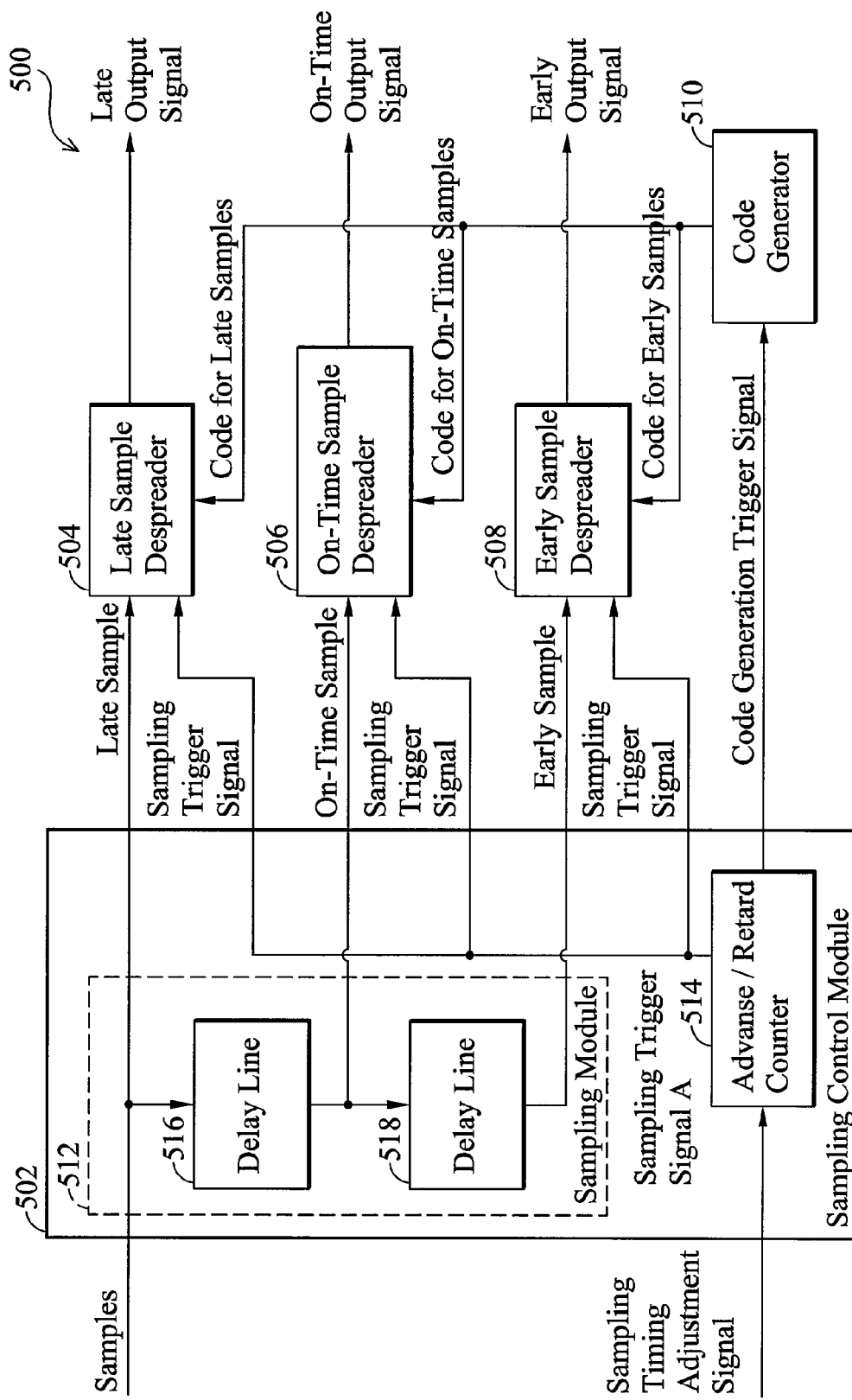
FIG. 5 is a block diagram of a portion of a CDMA receiver according to the invention.

FIG. 5 is a block diagram of an embodiment, which shows a portion of a CDMA receiver 500, according to the invention. The CDMA receiver 500 includes a sampling control module 502, a code generator 510, and despreaders 504, 506, and 508 respectively corresponding to late samples, on-time samples, and early samples, and an optimal sample decision module. The sampling control module 502 is used in place of the sampling module 102 of FIG. 1. Although the optimal sample decision module is not shown in FIG. 5, it is coupled to the despreaders 504, 506, and 508 as the coupling of the optimal sample decision module 110 of FIG. 1.

The sampling control module 502 includes a sampling module 512 and an advance-retard counter 514. The sampling module 512 includes a plurality of delay lines, and the number of the delay lines is determined according to the number of the output signals of the optimal sample decision module. In one embodiment, because the output signals include a late output signal, an on-time output signal, and an early output signal, the sampling module 502 includes two delay lines 516 and 518. A series of samples with higher sampling rate is first delivered to the delay line 516, which delays the samples for a predetermined period to obtain a series of first delayed samples. The series of first delayed samples is further delayed by the delay line 518 for a predetermined period to obtain a series of second delay samples. The advance-retard counter 514 generates a sampling trigger signal for the despreaders 504, 506, and 508 and a code generation trigger signal 510 for the code generator 510. The advance-retard counter 514 adjusts the timings of the sampling trigger signal and the code generation trigger signal in response to a sampling timing adjustment signal generated by the optimal sample decision module.

The series of samples without delay are delivered to the despreader 504. The despreader 504 first decimates the samples according to the sampling trigger signal generated by the advance-retard counter 514 to obtain a series of late samples. The despreader 504 then demodulates the late samples with codes generated by the code generator 510 to obtain a late output signal. The delayed samples generated by the delay lines 516 and 518 are delivered to the despreaders 506 and 508, respectively. The despreaders 506 and 508 first decimate the received delayed samples according to the sampling trigger signal to respectively obtain a series of on-time samples and a series of early samples, and then respectively demodulate the on-time samples and the early samples with dispreading codes generated by the code generator 510 to respectively obtain an on-time output signal and an early output signal. The optimal sample decision module first selects an optimal output signal among the late output signal, the on-time output signal, and the early output signal, and then generates a sampling timing adjustment signal according to optimal signal selection to adjust timings of the sampling trigger signal and the code generation trigger signal.

Figure 2:
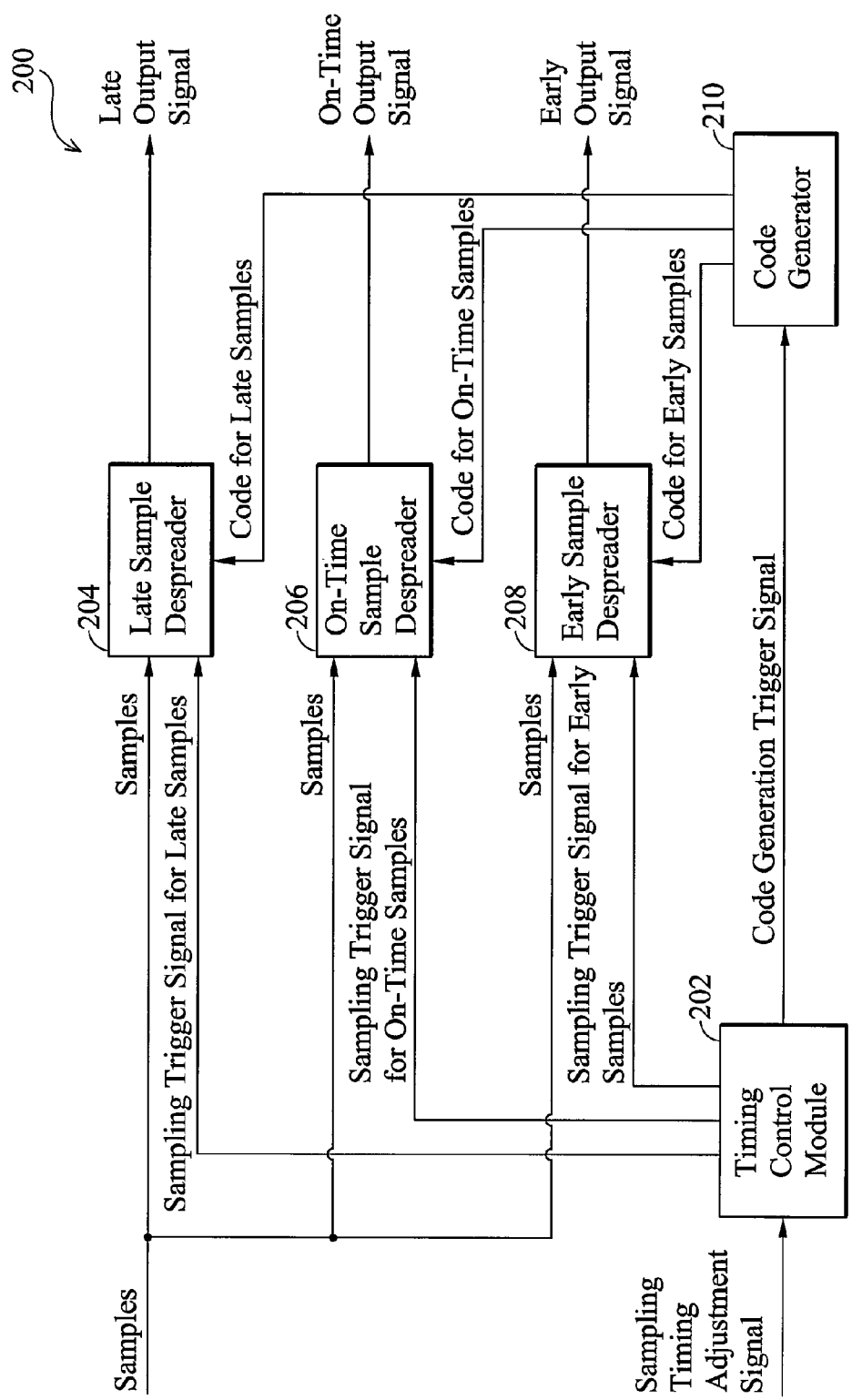
FIG. 2 is a block diagram of a portion of CDMA receiver.

In comparison with prior art shown in the FIG. 2, the sampling control module 502 shown in the FIG. 5 uses only a sampling trigger signal in place of the three sampling trigger signals shown in the FIG. 2 for triggering the down-sampling or decimation of the three despreaders 504, 506, and 508. Additionally, the code generator 510 generates only a despreading code signal in place of the three different despreading code signals of FIG. 2 for demodulation process of despreaders 504, 506, and 508. Because there is only one sampling trigger signal and only one despreading code signal, the obtained late output signal, on-time output signal, and early output signal are synchronously outputted, the system design for the CDMA receiver 500 is thus simplified.

Figure 6:
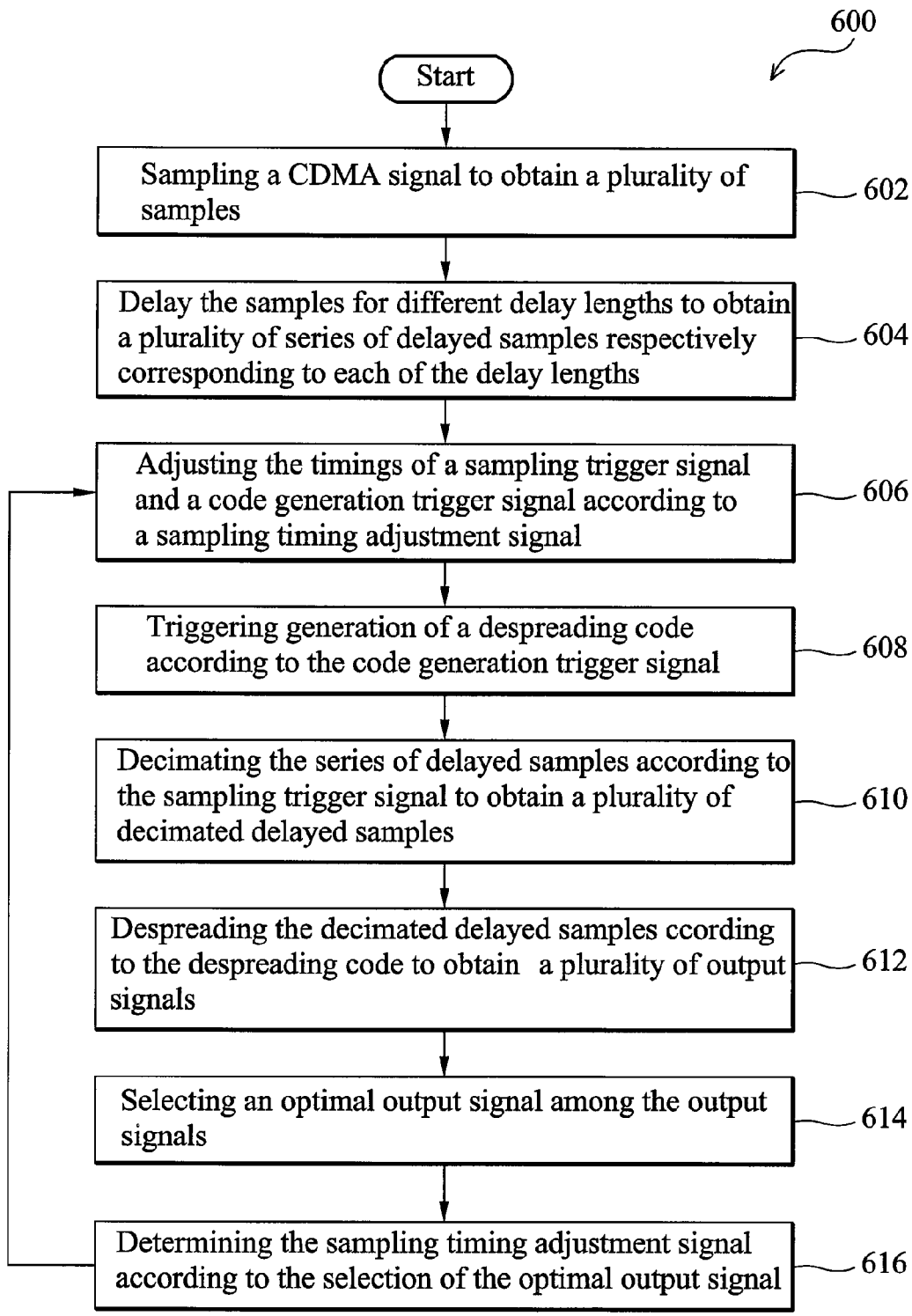
FIG. 6 is a flowchart of a method for processing a CDMA signal according to the invention.

FIG. 6 is a flowchart of an embodiment, which shows a method 600 for processing a CDMA signal, according to the invention. First, a CDMA signal is sampled in step 602 to obtain a series of samples. The samples are then delayed for different delay lengths in step 604 to obtain a plurality of series of delayed samples respectively corresponding to each of the delay lengths, such as the first delayed samples and the second delayed samples of the embodiment shown in the FIG. 5. Timings of a sampling trigger signal and a code generation trigger signal are then adjusted according to a sampling timing adjustment signal in step 606, and a despreading code is then generated according to the code generation trigger signal in step 608.

The series of delayed samples with a higher sampling rate are then decimated according to the sampling trigger signal in step 610 to obtain a plurality of decimated delayed samples. For example, the decimated delayed samples are the late samples with a short delay, the on-time samples with a medium delay, and the early samples with a long delay. The decimated delayed samples are then demodulated according to the despreading code in step 612 to obtain a plurality of output signals, such as the late output signal, the on-time output signal, and the early output signal. An optimal output signal is then selected among the output signals in step 614. Finally, the sampling timing adjustment signal is adjusted according to the selection of the optimal output signal in step 616, and the adjusted sampling timing adjustment signal further adjusts timings of the sampling trigger signal and the code generation trigger signal in step 606.

Figure 7A:
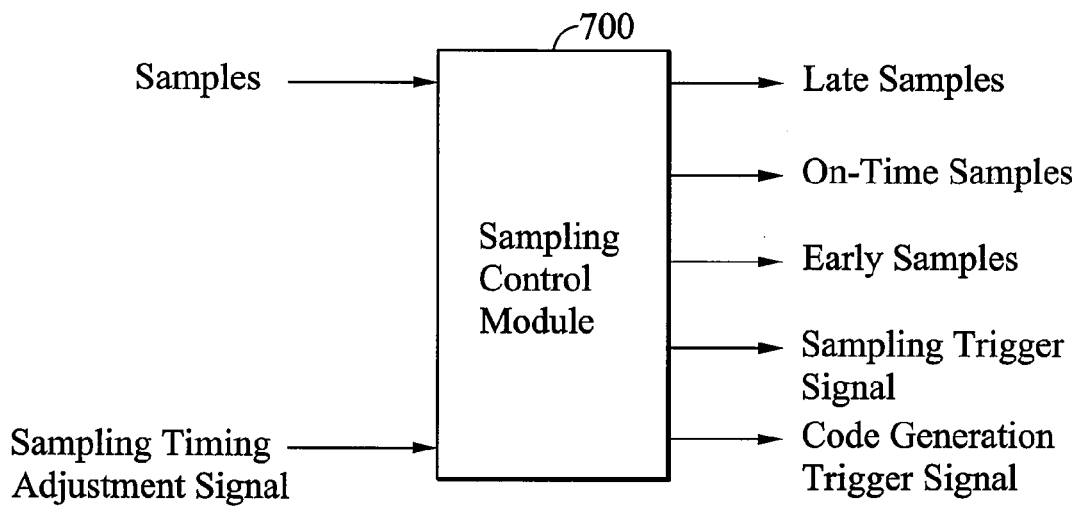
FIG. 7a shows an embodiment of a sampling control module according to the invention.
Figure 7B:
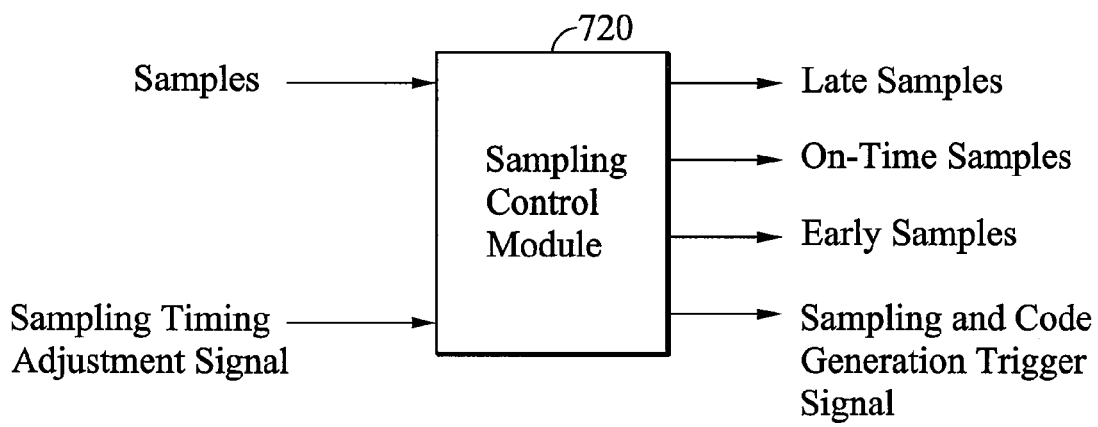
FIG. 7b shows another embodiment of a sampling control module according to the invention.

FIG. 7a shows an embodiment of a sampling control module 700 according to the invention. The sampling control module 700 receives a series of samples with a higher sampling rate, and generates a sampling trigger signal to decimate the samples to obtain the late samples, the on-time samples, and the early samples. The sampling control module 700 also generates a code generation trigger signal to a code generator to generate a code for demodulation of the late samples, the on-time samples, and the early samples. In addition, the sampling control module 700 adjusts timings of the sampling trigger signal and the code generation trigger signal according to a sampling timing adjustment signal. The sampling trigger signal and the code generation trigger signal, however, can be the same signal. FIG. 7b shows another embodiment of a sampling control module 720 according to the invention. The sampling control module 720 generates only a sampling and code generation trigger signal to substitute the sampling trigger signal and the code generation trigger signal of FIG. 7a.

Figure 8A:
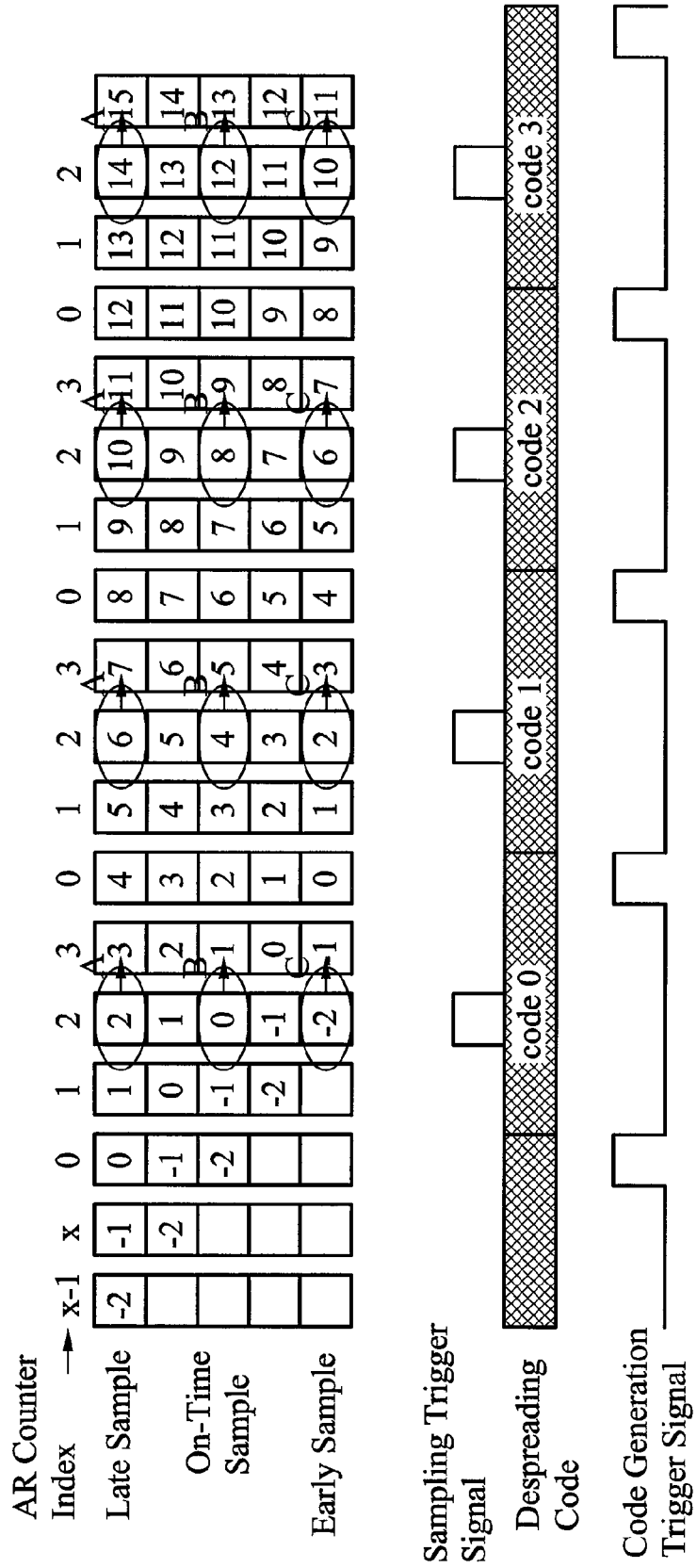
FIG. 8a shows normal decimation and demodulation in despreaders with a decimation factor of 4.
Figure 8B:
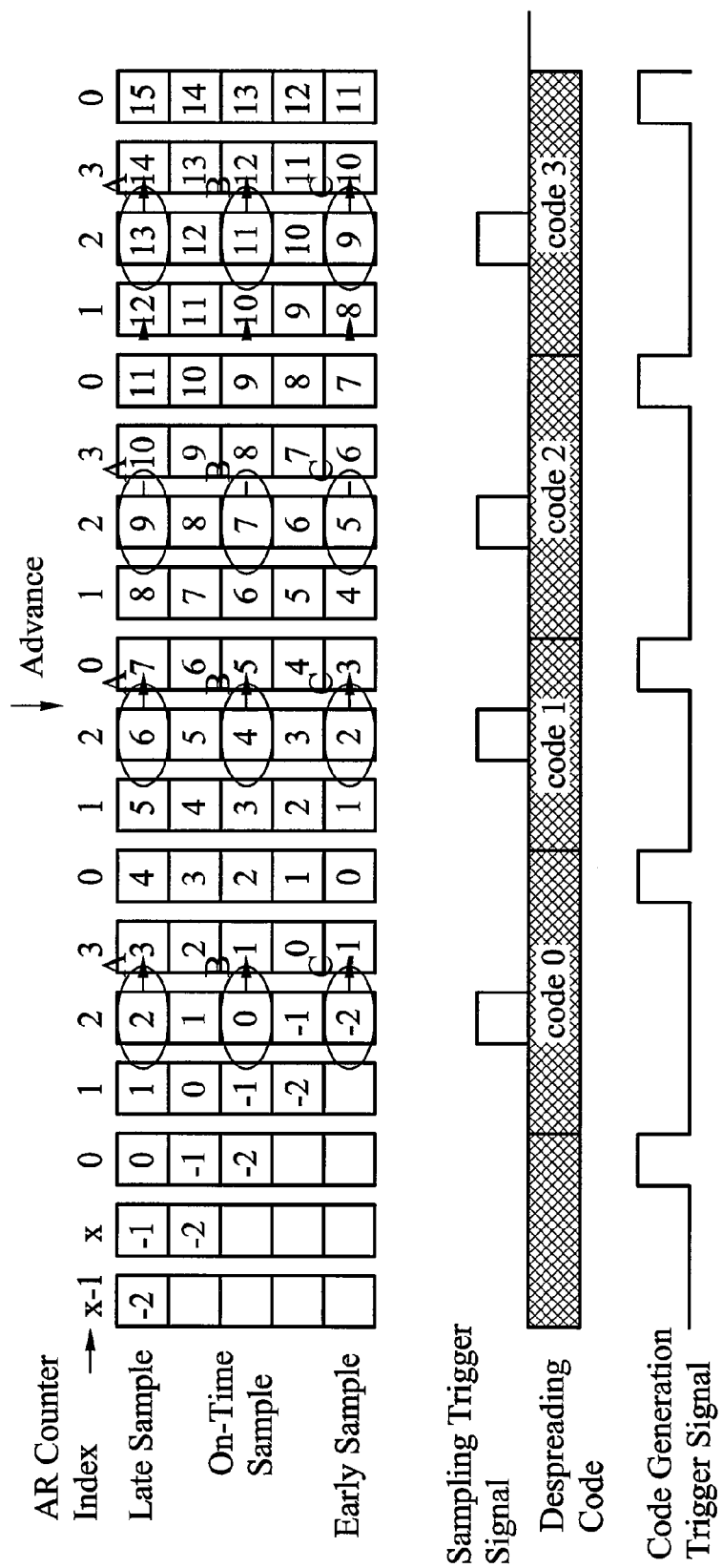
FIG. 8b shows adjustment of decimation and demodulation in despreaders in response to a sampling timing adjustment signal indicating advancement.
Figure 8C:
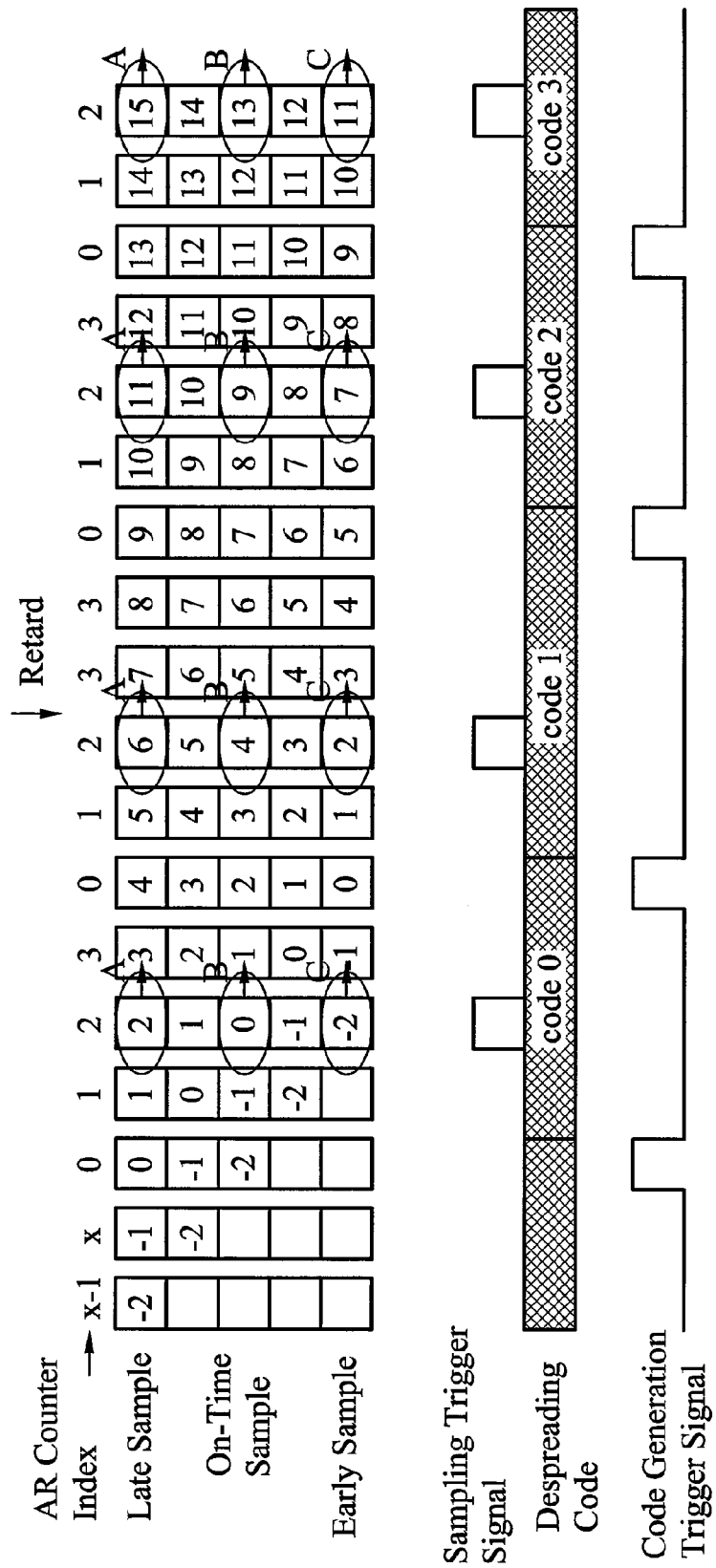
FIG. 8c shows adjustment of decimation and demodulation in despreaders in response to a sampling timing adjustment signal indicating retardation.

FIG. 8a to 8c show decimation and demodulation in despreaders 504, 506, and 508 with a decimation factor of 4 in accordance with an embodiment of this invention. FIG. 8a shows normal decimation and demodulation according to the sampling trigger signal and the code generation trigger signal generated by the sampling control module 502. A series of samples with indices of −2~15 are shown. The samples simply form a series of late samples. The series of samples are delayed by the delay line 516 for two sampling periods to obtain a series of on-time samples. The series of samples are delayed by both the delay lines 516 and 518 for four sampling periods in total to obtain a series of early samples. Because the decimating factor is 4, the despreaders 504, 506, and 508 select one sample from every four samples according to a sampling trigger signal to obtain the early samples, the on-time samples, and the late samples, respectively. The enabling periods of the sampling trigger signal corresponding to the early samples, the on-time samples, and the late samples are respectively marked with letters "C", "B", and "A" in FIG. 8a.

Figure 3A:
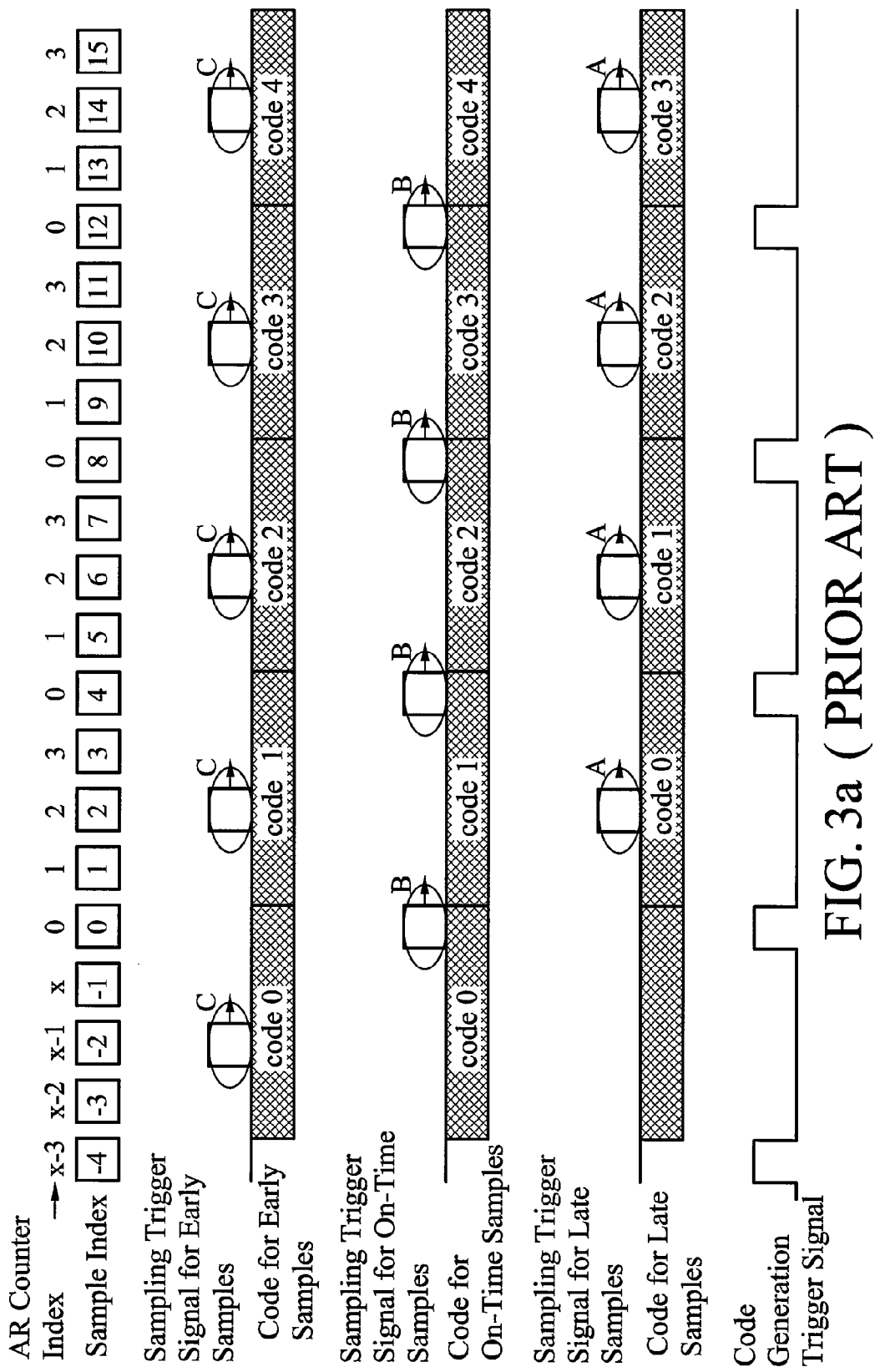
FIG. 3a shows normal decimation and demodulation in despreaders with a decimation factor of 4.

An advance-retard counter (AR) periodically repeats per 4 in order to fit the requirement of the decimating factor of 4. If a sample with the AR counter index of 2 is selected by the sampling trigger signal as a late sample, the sampling control module 502 needs only enable the same sampling trigger signal to obtain an on-time sample as well as a early sample during the period corresponding to the samples with the AR counter index of 2. In comparison with the timing control module 202 which separately enables three sampling trigger signals corresponding to the samples with the AR counter indices of −2, 0, and 2, respectively, the design of the sampling control module 502 is much simpler and more efficient. In addition, the early samples, the on-time samples, and the late samples of FIG. 3a are respectively generated at times with the AR counter indices of −2, 0, and 2. The early samples, the on-time samples, and the late samples of FIG. 8a, however, are synchronously generated at the same time. Thus, the problem of asynchronous output signals of the timing control module 202 shown in the FIG. 2 is solved.

Figure 3B:
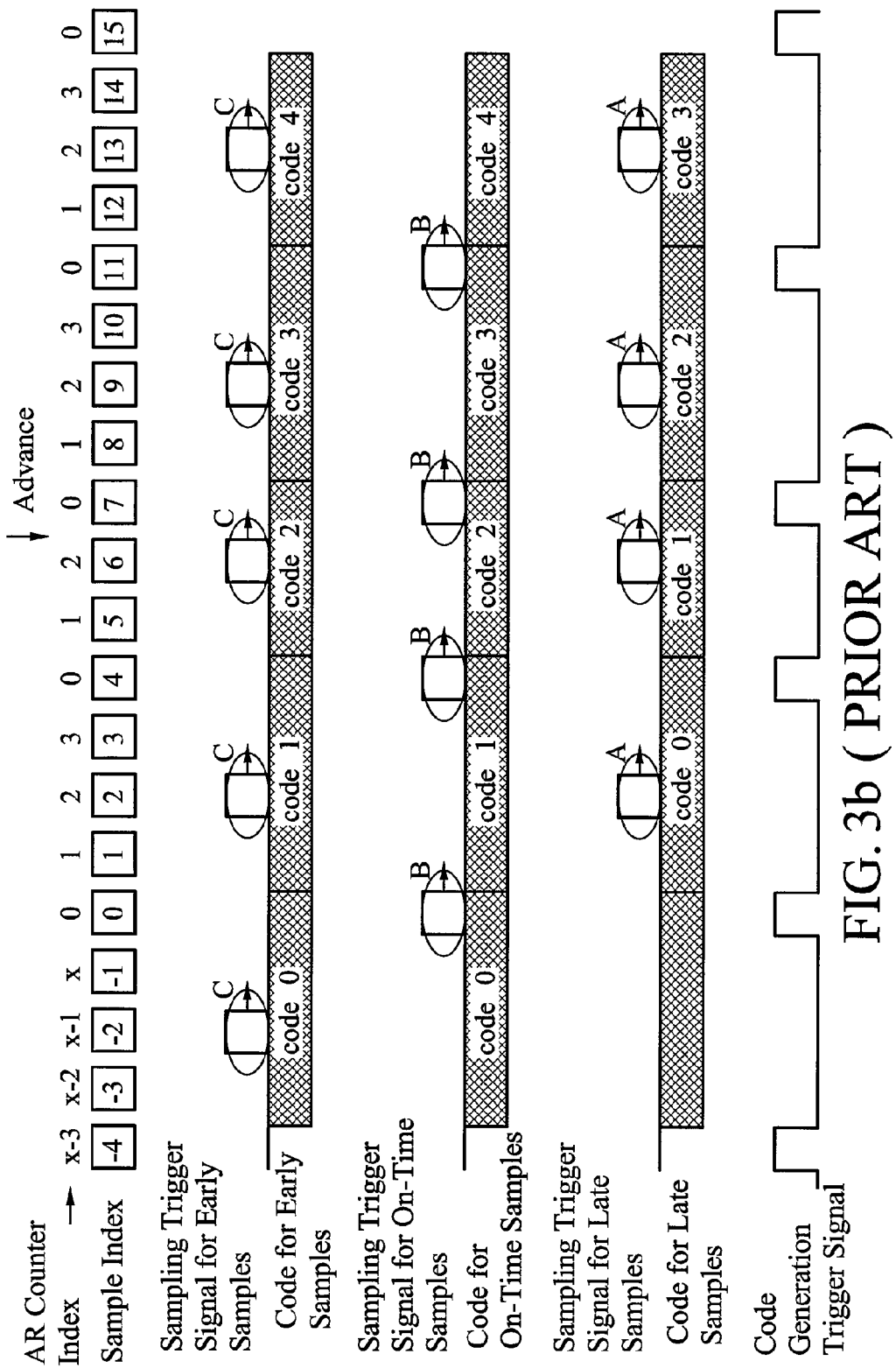
FIG. 3b shows adjustment of decimation and demodulation in despreaders in response to a sampling timing adjustment signal indicating advancement.

FIG. 8b shows an embodiment which is the adjustment of decimation and demodulation in despreaders 504, 506, and 508 in response to a sampling timing adjustment signal indicating advancement. The sampling timing adjustment signal advances the sampling of the on-time samples and the late samples. Thus, the despreaders 504, 506, and 508 shown in the FIG. 8b respectively take the samples 9, 7, and 5 instead of taking the original samples 10, 8, and 6 shown in the FIG. 8a as a late sample, an on-time sample, and an early sample. Accordingly, the code generation trigger signal is also advanced for a sampling period to trigger the code generator 510 to generate the despreading codes. In comparison with the sampling error of the early sample shown in the FIG. 3b, no sampling errors occur to affect generation of the early output signal in the embodiment, and results in an accurate selection of an optimal sample in the optimal sample decision module.

Figure 3C:
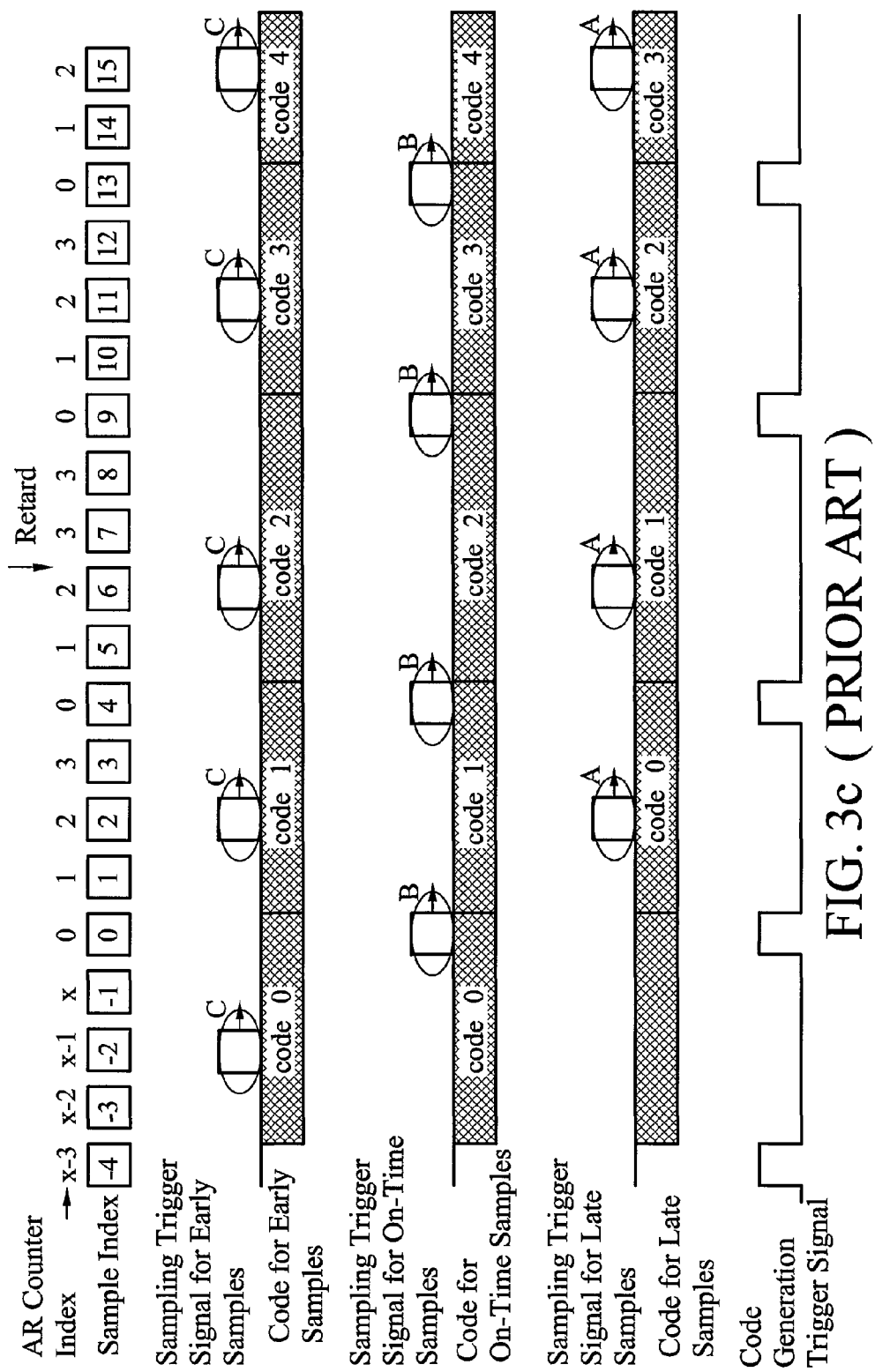
FIG. 3c shows adjustment of decimation and demodulation in despreaders in response to a sampling timing adjustment signal indicating retardation.
Figures 1, 4A:
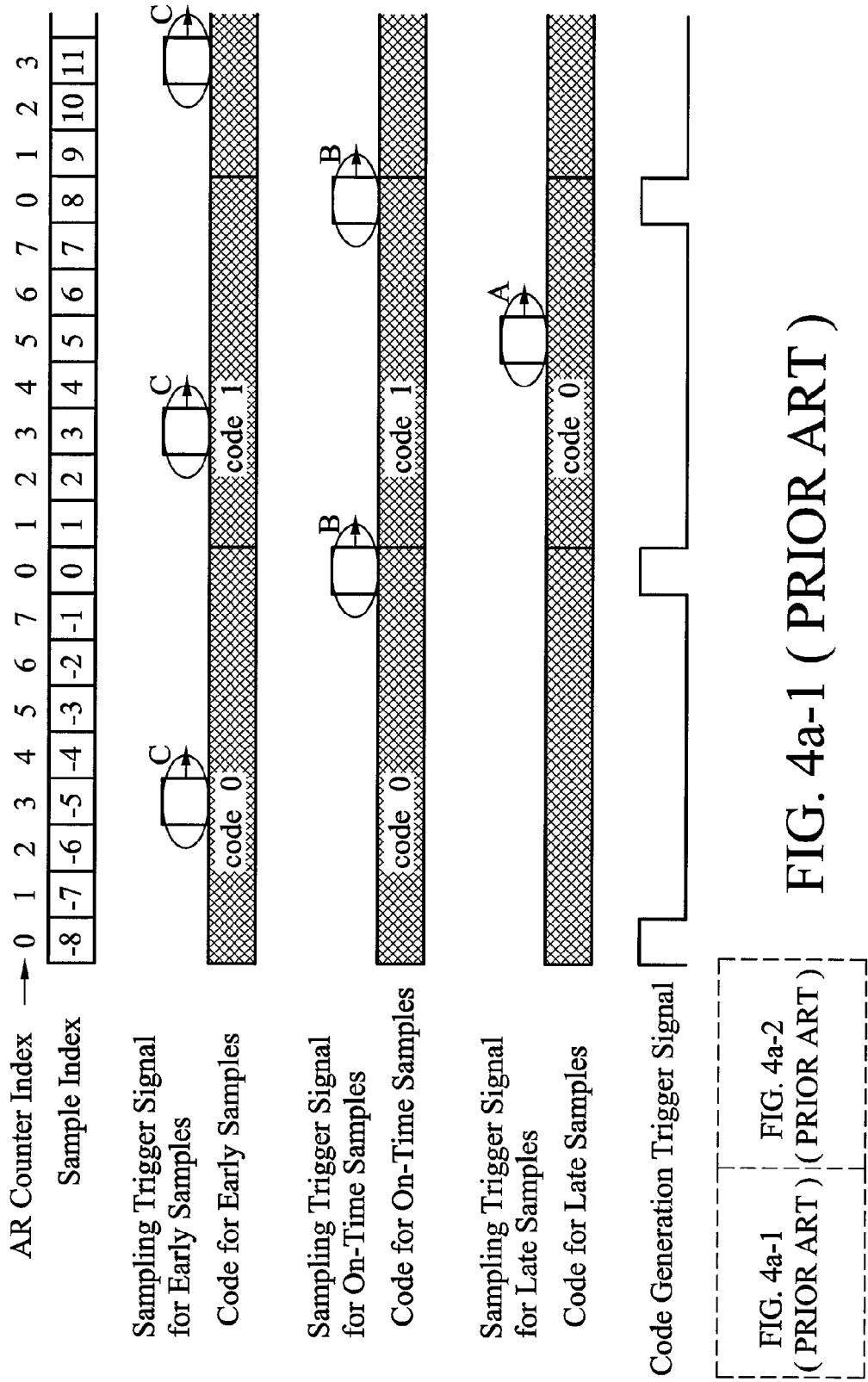
FIG. 4a shows normal decimation and demodulation in despreaders with a decimation factor of 8.
Figures 2, 4A:
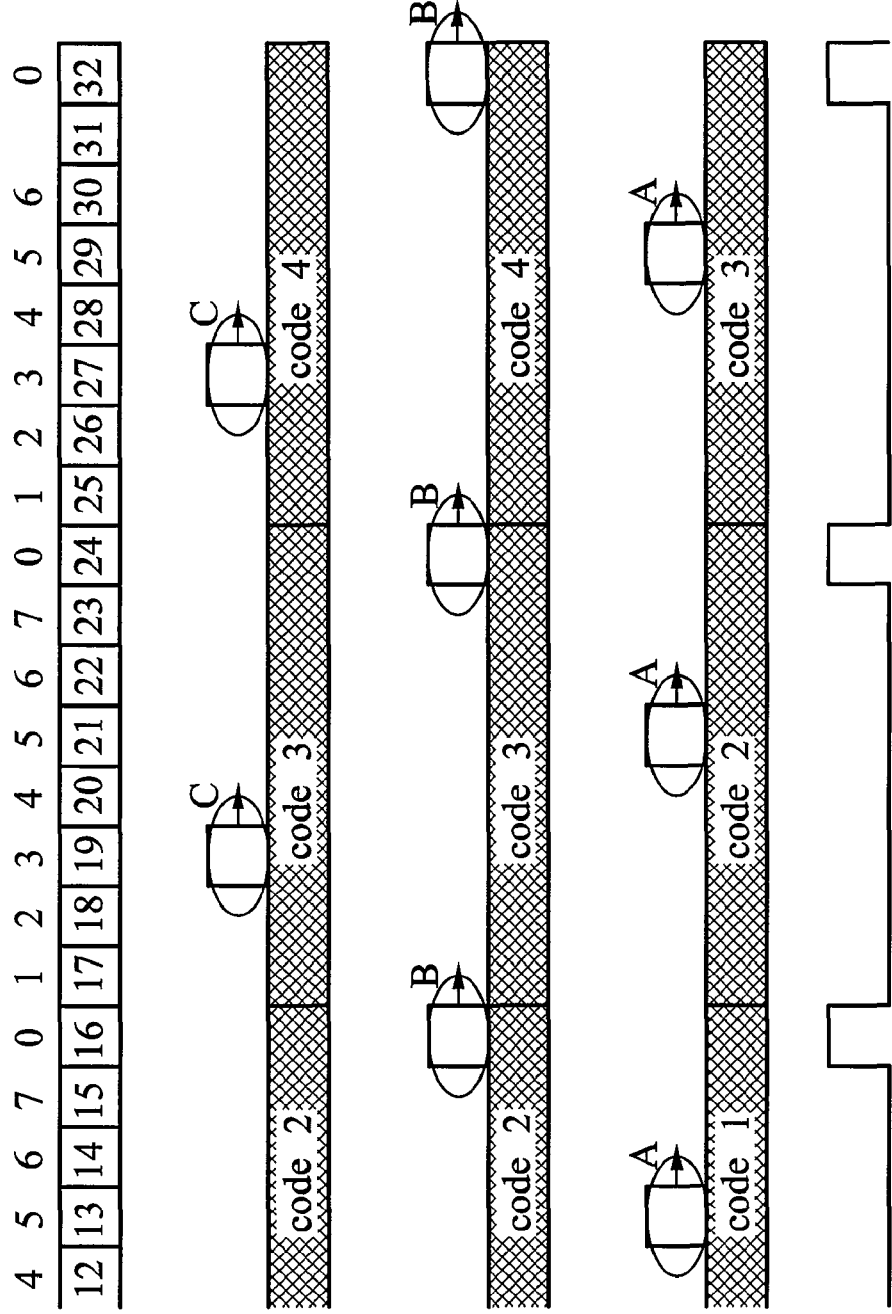
Figures 1, 4B:
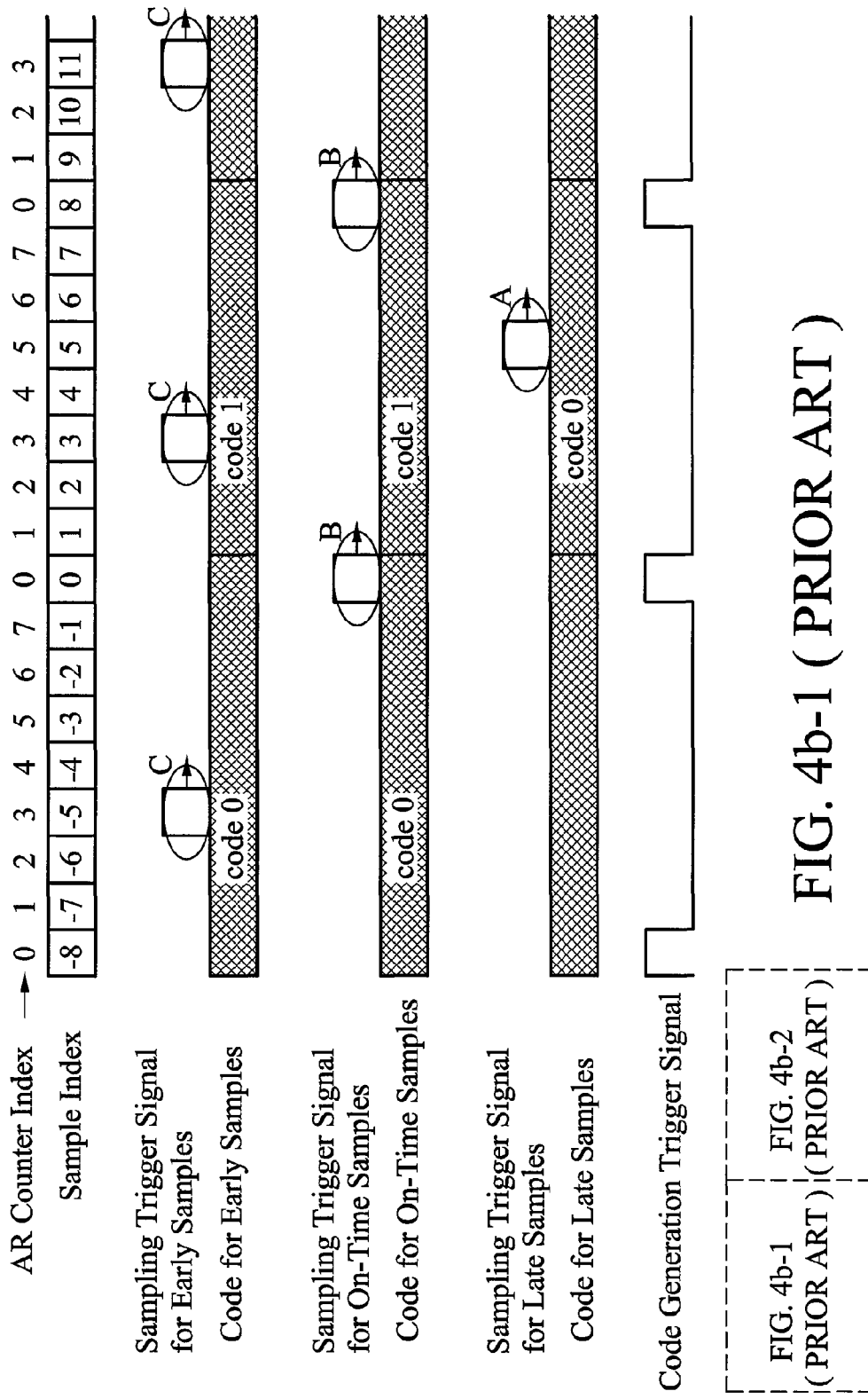
FIG. 4b shows adjustment of decimation and demodulation in despreaders in response to a sampling timing adjustment signal indicating advancement.
Figures 2, 4B:
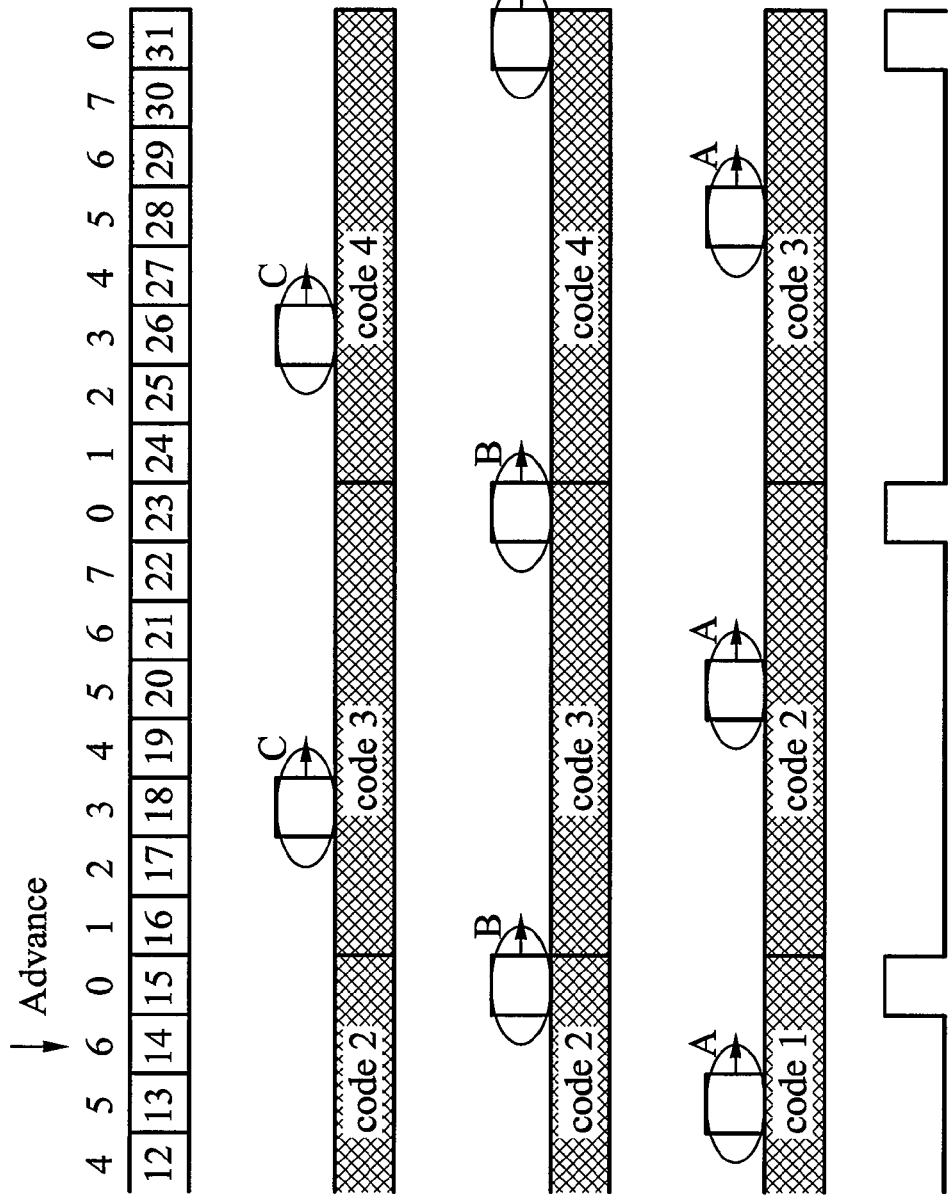
Figures 1, 4C:
FIG. 4c shows adjustment of decimation and demodulation in despreaders in response to a sampling timing adjustment signal indicating retardation.
Figures 2, 4C:
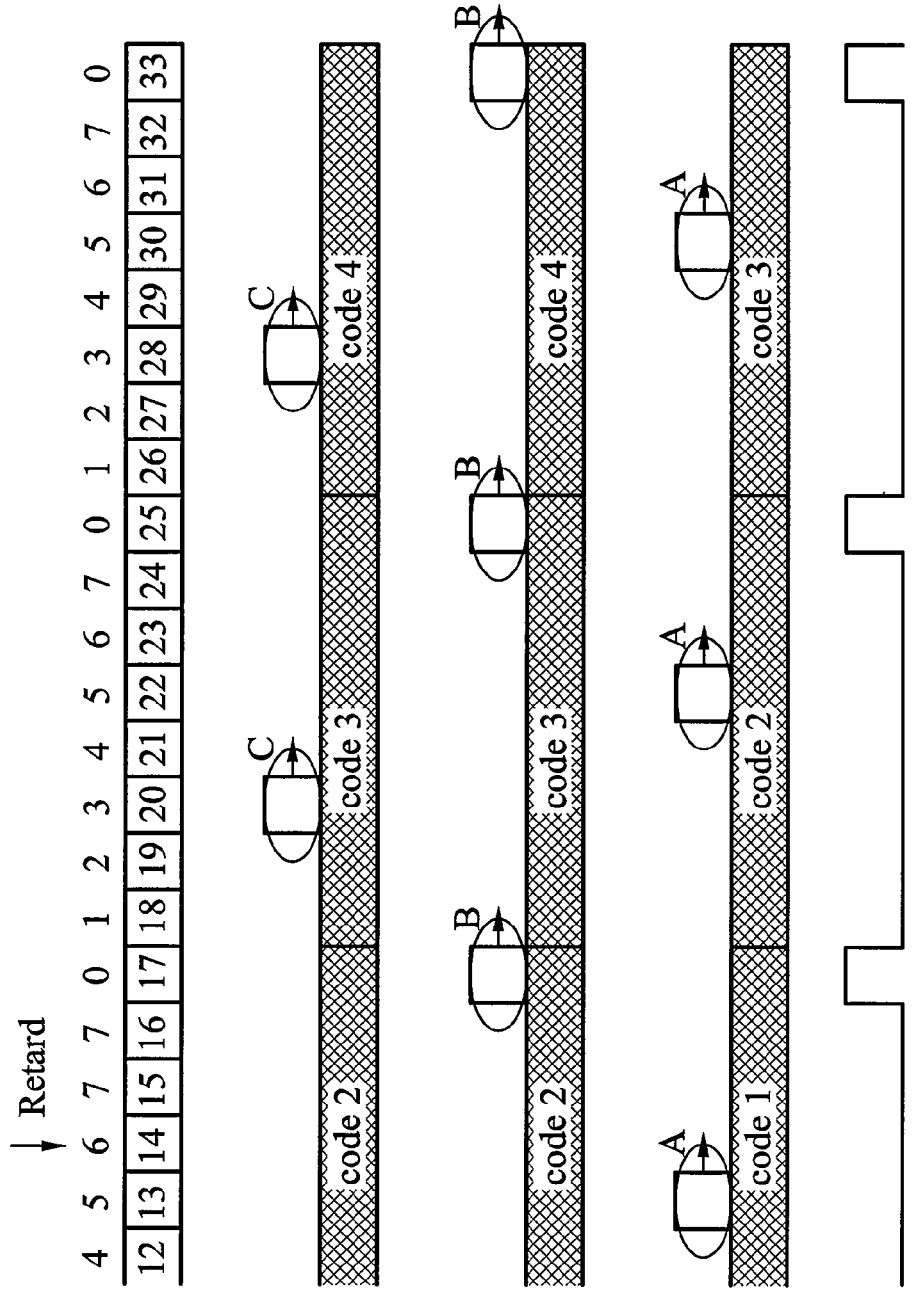

FIG. 8c shows an embodiment which is the adjustment of decimation and demodulation in despreaders 504, 506, and 508 in response to a sampling timing adjustment signal indicating retardation. The sampling timing adjustment signal retards the sampling of the on-time samples and the late samples at the sample index of 6. Thus, the despreaders 504, 506, and 508 shown in the FIG. 8c respectively take the samples 11, 9, and 7 instead of taking the original samples 10, 8, and 6 shown in the FIG. 8a as a late sample, an on-time sample, and an early sample. Accordingly, the code generation trigger signal is also retarded for a sampling period to trigger the code generator 510 to generate the despreading codes. In comparison with the sampling error of the early sample shown in the FIG. 3c, no sampling errors occur to affect the generation of the early output signal in the embodiment, and results in an accurate selection of an optimal sample in the optimal sample decision module.

Figures 1, 9A:
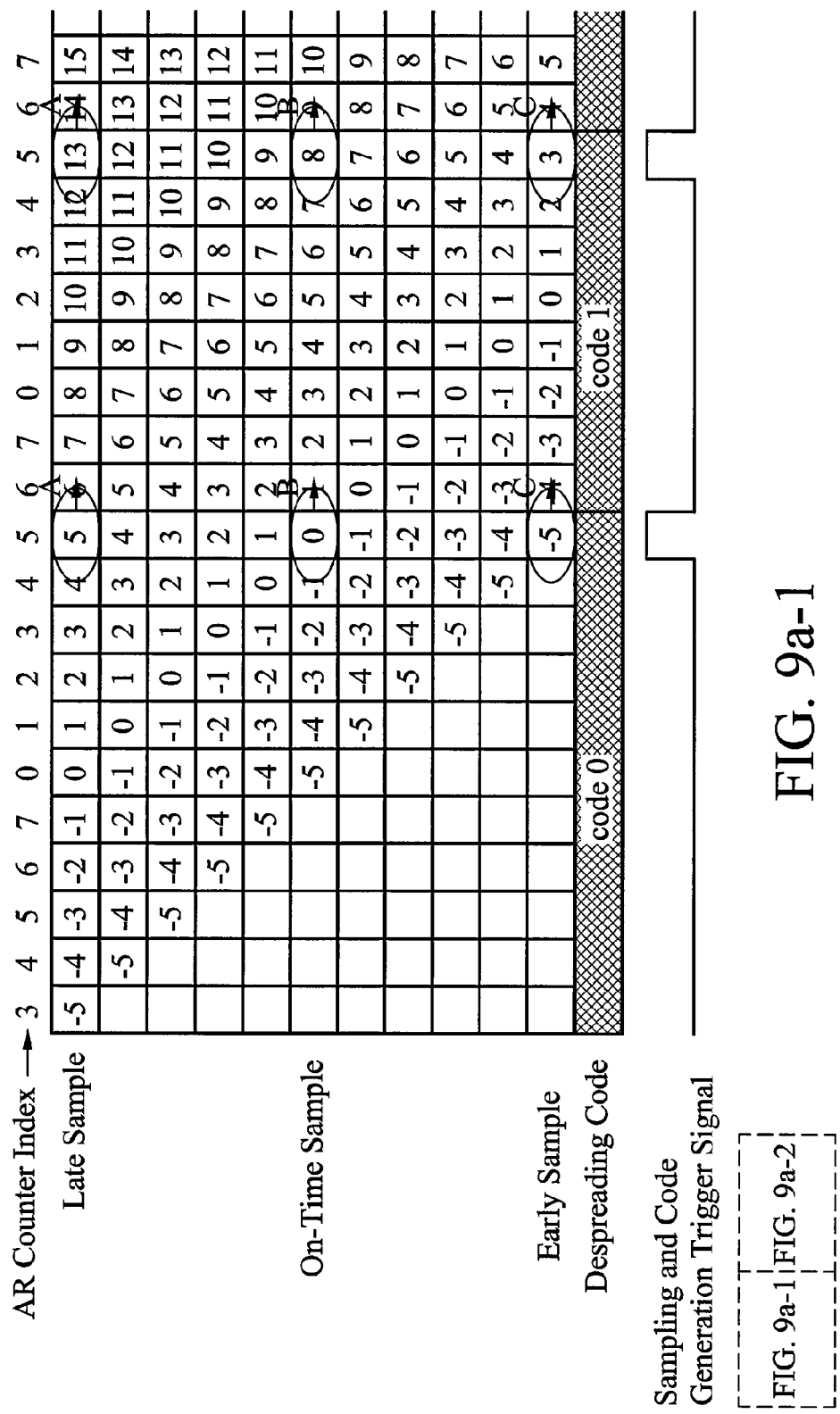
FIG. 9a shows normal decimation and demodulation in despreaders with a decimation factor of 8.
Figures 1, 9B:
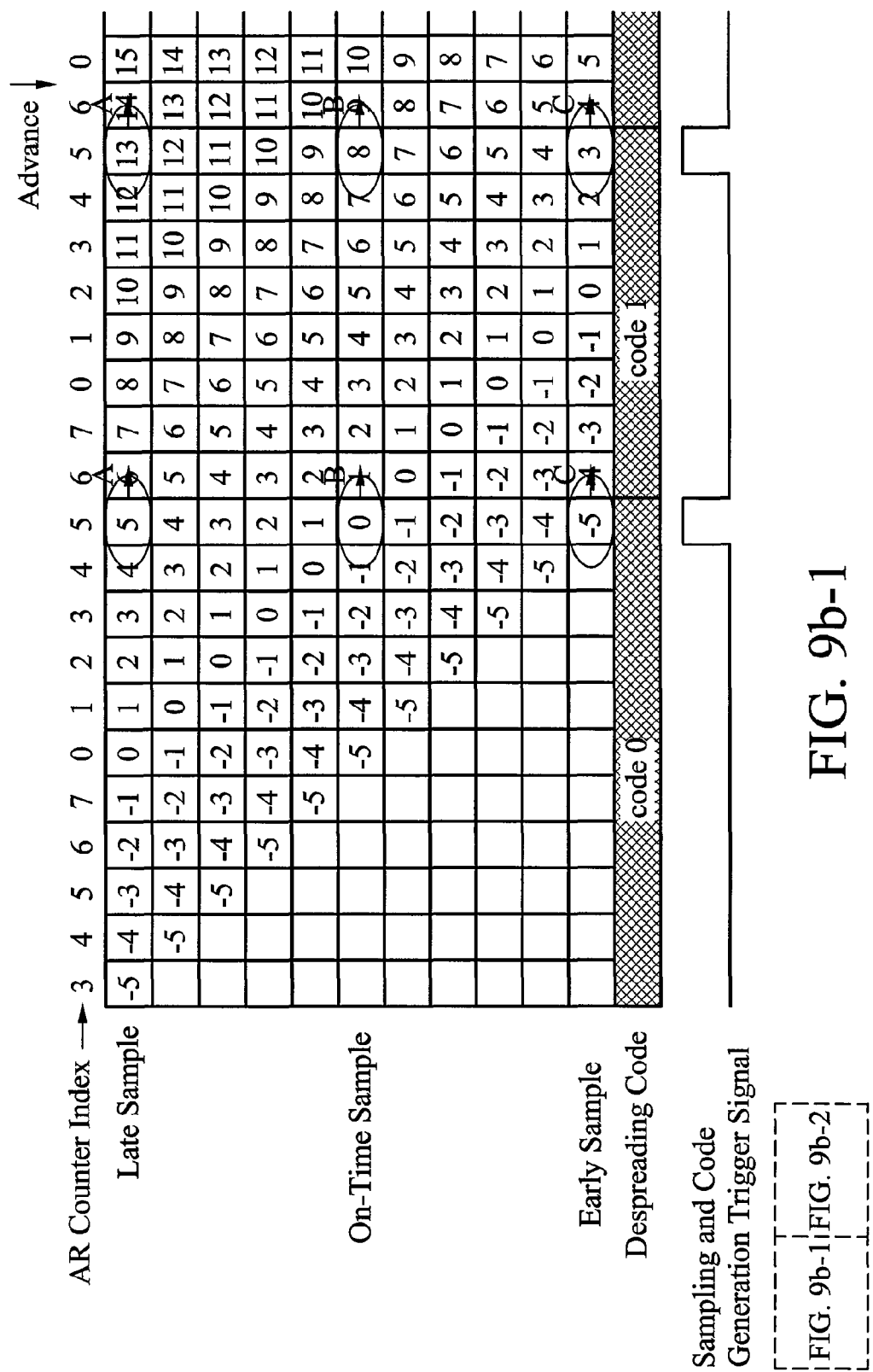
FIG. 9b shows adjustment of decimation and demodulation in despreaders in response to a sampling timing adjustment signal indicating advancement.
Figures 2, 9B:
Figures 1, 9C:
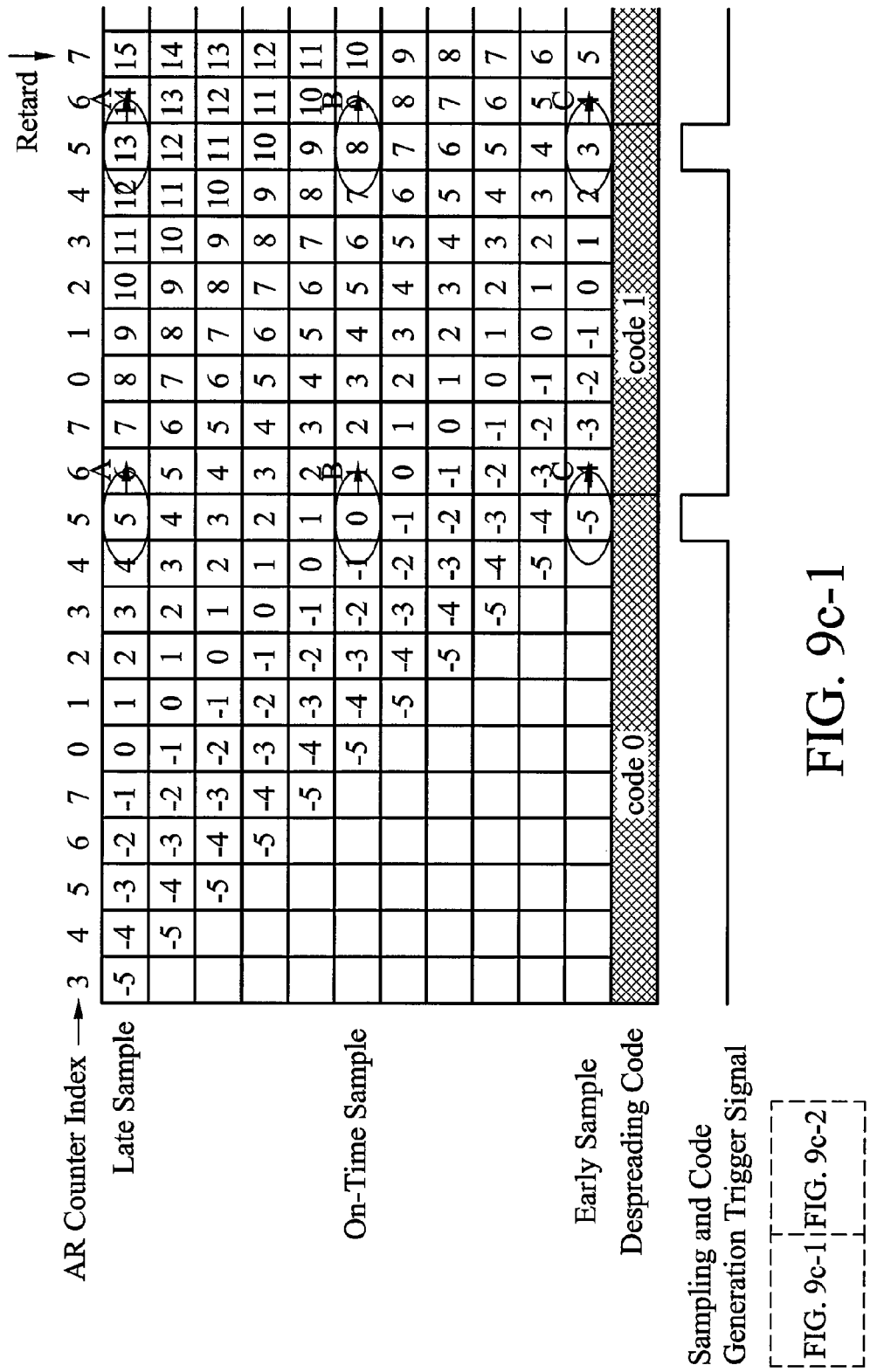
FIG. 9c shows adjustment of decimation and demodulation in despreaders in response to a sampling timing adjustment signal indicating retardation.

FIG. 9a to 9c show decimation and demodulation in despreaders 504, 506, and 508 with a decimation factor of 8 in accordance with an embodiment of this invention. FIG. 9a shows normal decimation and demodulation according to a sampling and code generation trigger signal generated by the sampling control module 502. FIGS. 9b and 9c respectively show adjustment of decimation and demodulation in despreaders 504, 506, and 508 in response to sampling timing adjustment signals indicating advancement and retardation. In addition to the difference of a decimation factor, the sampling trigger signal and the code generation trigger signal of FIG. 8 is replaced by a sampling and code generation trigger signal, as shown in FIG. 7b. Although there is only one sampling and code generation trigger signal to trigger the sampling and code generation, the sampling control module 502 still functions as desired without errors.

Figure 10:
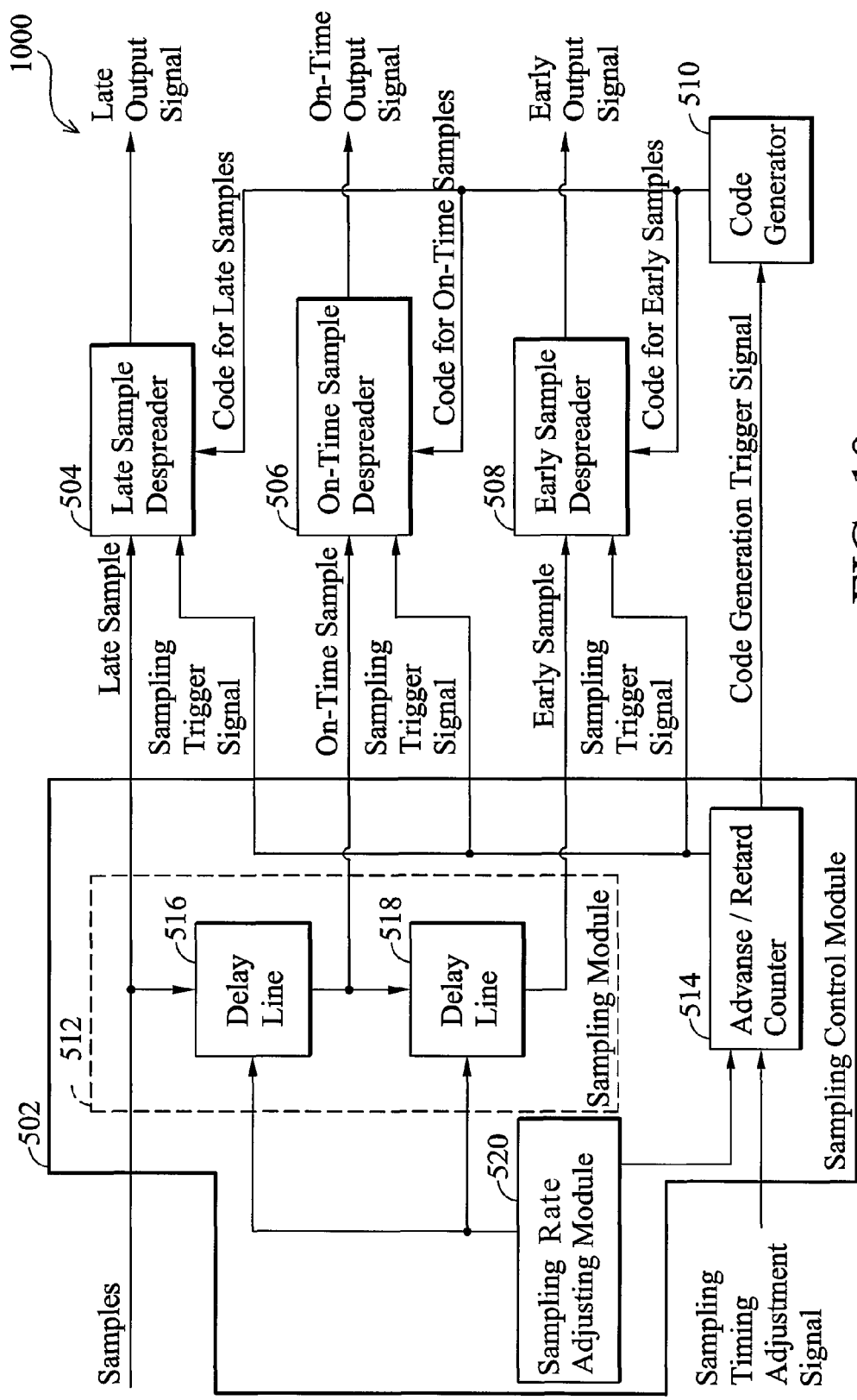
FIG. 10 is a block diagram of a portion of a CDMA receiver according to the invention.

FIG. 10 is a block diagram of a portion of a CDMA receiver 1000 according to the invention. The CDMA receiver 1000 differs from the CDMA receiver 500 of FIG. 5 only in a sampling rate adjusting module 520 installed in the sampling control module 502. A sampling rate of the decimated delayed samples is assumed to be adjustable. For example, the decimation factor of the decimated delayed samples can be changed from 4 to 8, such as shown in the FIGS. 8 and 9. Thus, the sampling rate adjusting module 520 adjusts the delay lengths of the delay lines according to the decimation factor, and adjusts timings of the sampling trigger signal and the code generation trigger signal according to the decimation factor. Thus, the despreaders 504, 506, and 508 can still normally function as desired even if the decimation factor is changed.

The invention provides a method for processing a CDMA signal. The samples of the CDMA signal are delayed for different delay periods to obtain multiple series of delayed samples. The delayed samples are then decimated to obtain a plurality of decimated delayed samples, and the decimated delayed samples are then demodulated to obtain multiple output signals. Only a sampling trigger signal is used to trigger the decimation, and only a code generation trigger signal is used to trigger generation of the despreading code for demodulation. Thus, the output signals are synchronous, simplifying the system design of a CDMA receiver. Additionally, no sampling errors occur if a sampling timing adjustment signal is used to advance or retard the timings of the sampling trigger signal and the code generation trigger signal, improving accuracy of selection of an optimal output signal.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Code Division Multiple Access (CDMA) receiver for sampling a received CDMA signal into a plurality of samples, the CDMA receiver comprising:
a sampling control module, delaying the samples for a plurality of different delay lengths to obtain a plurality of series of delayed samples respectively corresponding to each of the delay lengths, and adjusting timings of a sampling trigger signal and a code generation trigger signal according to a sampling timing adjustment signal;
a code generator, coupled to the sampling control module, generating a despreading code according to the code generation trigger signal; and
a plurality of despreaders, coupled to the sampling control module and the code generator, decimating the plurality of series of delayed samples according to the sampling trigger signal to obtain a plurality of series of decimated delayed samples, and despreading the plurality of series of decimated delayed samples with the despreading code to obtain a plurality of output signals;
wherein the sampling trigger signal triggers the despreaders to decimate the plurality of series of delayed samples at the same time to obtain the plurality of series of decimated delayed samples, and the despreaders demodulate the plurality of series of decimated delayed samples according to the same despreading code to obtain the plurality of output signals.

2. The CDMA receiver as claimed in claim 1, wherein the CDMA receiver further comprises an optimal sample decision module, coupled to the despreaders and the sampling control module, selecting an optimal output signal from the output signals, and generating the sampling timing adjustment signal according to the selection of the optimal output signal.

3. The CDMA receiver as claimed in claim 1, wherein the sampling control module comprises:
a sampling module, comprising a plurality of delay lines, delaying the samples for predetermined delay lengths to obtain the delayed samples corresponding to each of the delay lengths, respectively; and
an advance-retard counter, coupled to the plurality of despreaders, adjusting timings of the sampling trigger signal and the code generation trigger signal according to the sampling timing adjustment signal.

4. The CDMA receiver as claimed in claim 1, wherein the sampling trigger signal and the code generation trigger signal are the same signal.

5. The CDMA receiver as claimed in claim 1, wherein the delayed samples comprises a series of late samples, a series of on-time samples, and a series of early samples, wherein the series of on-time samples are obtained by delaying the series of early samples, and the series of late samples are obtained by delaying the series of on-time samples.

6. The CDMA receiver as claimed in claim 1, wherein the sampling timing adjustment signal comprises one of the following indications: advancement and retardation, wherein the sampling control module advances the timings of the sampling trigger signal and the code generation trigger signal if the sampling timing adjustment signal indicates advancement, and the sampling control module delays the timings of the sampling trigger signal and the code generation trigger signal if the sampling timing adjustment signal indicates retardation.

7. The CDMA receiver as claimed in claim 3, wherein a decimation factor of the samples is adjustable, and the sampling control module further comprises a sampling rate adjusting module, coupled to the advance-retard counter and the sampling module, wherein the sampling rate adjusting module configured for adjusting the delay lengths of the delay lines according to the decimation factor, and adjusting timings of the sampling trigger signal and the code generation trigger signal according to the decimation factor.

8. The CDMA receiver as claimed in claim 3, wherein the delay lines of the sampling module are cascaded.

9. A method for processing a Code Division Multiple Access (CDMA) signal, comprising:
sampling the CDMA signal into a plurality of samples;
delaying the samples for a plurality of different delay lengths to obtain a plurality of series of delayed samples respectively corresponding to each of the delay lengths;
adjusting timings of a sampling trigger signal and a code generation trigger signal according to a sampling timing adjustment signal;
generating a despreading code according to the code generation trigger signal;
decimating the plurality of series of delayed samples according to the sampling trigger signal to obtain a plurality of series of decimated delayed samples, wherein the plurality of series of delayed samples are decimated at the same time according to the sampling trigger signal to generate the plurality of series of decimated delayed samples; and
demodulating the plurality of series of decimated delayed samples according the despreading code to obtain a plurality of output signals.

10. The method as claimed in claim 9, wherein the method further comprises:
selecting an optimal output signal from the output signals; and
generating the sampling timing adjustment signal according to the selection of the optimal output signal.

11. The method as claimed in claim 9, wherein the sampling trigger signal and the code generation trigger signal are the same signal.

12. The method as claimed in claim 9, wherein the delayed samples comprises a series of late samples, a series of on-time samples, and a series of early samples, wherein the series of on-time samples are obtained by delaying the series of early samples, and the series of late samples are obtained by delaying the series of on-time samples.

13. The method as claimed in claim 9, wherein the sampling timing adjustment signal comprises one of the following indications: advancement and retardation, wherein the timings of the sampling trigger signal and the code generation trigger signal are advanced if the sampling timing adjustment signal indicates advancement, and the timings of the sampling trigger signal and the code generation trigger signal are delayed if the sampling timing adjustment signal indicates retardation.

14. The method as claimed in claim 9, wherein a decimation factor of the samples is adjustable, the method further comprising:
  adjusting the delay lengths according to the decimation factor; and
  adjusting timings of the sampling trigger signal and the code generation trigger signal according to the decimation factor.

15. The method as claimed in claim 10, wherein the output signals are obtained by despreading the decimated delayed samples with the despreading code.

16. A sampling control module, processing a plurality of early samples derived from a CDMA signal received by a CDMA receiver, comprising:
  a first delay line, delaying the early samples to obtain a plurality of on-time samples;
  a second delay line, coupled to the first delay line, delaying the on-time samples to obtain a plurality of late samples; and
  an advance-retard counter, adjusting timings of a sampling trigger signal and a code generation trigger signal according to a sampling timing adjustment signal.

17. The sampling control module as claimed in claim 16, wherein the CDMA receiver generates a despreading code according to the trigger of the code generation trigger signal, respectively decimates the early samples, the on-time samples, and the delayed samples according to the sampling trigger signal to obtain a plurality of decimated early samples, a plurality of decimated on-time samples, and a plurality of decimated late samples, and respectively despreads the decimated early samples, the decimated on-time samples, and the decimated late samples with the despreading code to obtain a plurality of output signals.

18. The sampling control module as claimed in claim 16, wherein the CDMA receiver further selects an optimal output signal from the output signals, and generates the sampling timing adjustment signal according to the selection of the optimal output signal.

19. The sampling control module as claimed in claim 16, wherein the sampling trigger signal and the code generation trigger signal are the same signal.

20. The sampling control module as claimed in claim 16, wherein the sampling timing adjustment signal comprises one of the following indications: advancement and retardation, wherein the advance-retard counter advances the timings of the sampling trigger signal and the code generation trigger signal if the sampling timing adjustment signal indicates advancement, and the advance-retard counter delays the timings of the sampling trigger signal and the code generation trigger signal if the sampling timing adjustment signal indicates retardation.

* * * * *